United States Patent [19]

Krueger

[11] 4,034,062
[45] July 5, 1977

[54] REMOVAL OF OXYGEN FROM GAS STREAM WITH COPPER CATALYST

[75] Inventor: Bruno O. Krueger, Columbus, Ohio

[73] Assignee: Borden, Inc., Columbus, Ohio

[22] Filed: Mar. 20, 1975

[21] Appl. No.: 560,551

[52] U.S. Cl. ............................ 423/219; 423/245
[51] Int. Cl.² ................................ B01D 53/34
[58] Field of Search .......... 423/219, 230, 224, 245, 423/247, 248

[56] References Cited

UNITED STATES PATENTS

| 1,418,246 | 5/1922 | Frazer et al. | 423/247 |
| 1,911,780 | 5/1933 | White | 423/248 |
| 1,962,485 | 6/1934 | Dely | 423/239 |
| 3,420,618 | 1/1969 | Fleming | 423/219 |

FOREIGN PATENTS OR APPLICATIONS

| 555,588 | 8/1943 | United Kingdom | 423/245 |

Primary Examiner—Earl C. Thomas
Attorney, Agent, or Firm—George A. Kap; George P. Maskas; Daniel D. Mast

[57] ABSTRACT

Gas stream containing primarily hydrogen and carbon monoxide as well as small quantities of acetylene, oxygen and ethylene is passed through a bed of copper catalyst to remove all or substantial portion of acetylene, oxygen and ethylene.

10 Claims, 1 Drawing Figure

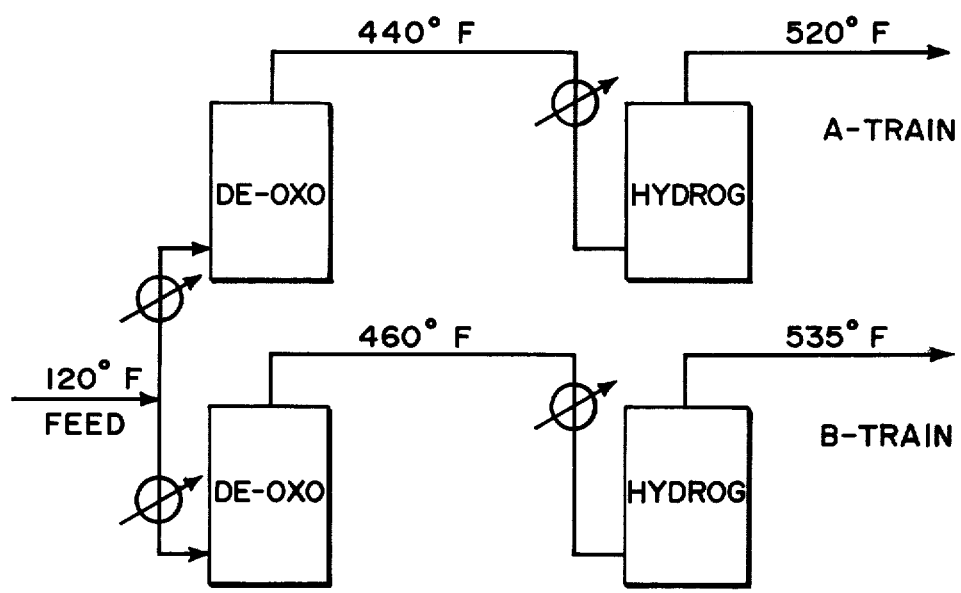

REMOVAL OF OXYGEN FROM GAS STREAM WITH COPPER CATALYST

This invention pertains to the use of a copper catalyst to remove small amounts of acetylene, oxygen, and ethylene in a gas stream coming from an acetlyene plant.

As is well known, acetylene is the base material for almost countless compounds. It can be polymerized to form benzene and ethyl benzene. It can be reacted with water to form acetaldehyde and ketones. By virtue of its reaction with halogens, hydrogen halide, hydrogen and water, it is a starting material for an almost inestimable number of organic compounds. The demand for acetylene had led to its production by virtually all available methods.

One method which is widely employed for the production of acetylene is the partial oxidation of methane in natural gas. Methane in natural gas is partially oxidized by the use of oxygen in a furnace or Sacchse generator at 1200° to 1800° F. The obtained acetylene containing gas stream which results, is sometimes called Sacchse gas. After the acetylene has been recovered, the remaining or by-product gas is still extremely valuable, and it is used as a source for carbon monoxide and hydrogen. The by-product stream after removal of acetylene from the Sacchse gas is a gas stream containing primarily hydrogen and carbon monoxide and also small quantities of oxygen, acetylene, ethylene and carbon dioxide. The composition of this gas stream after removal of the acetylene is:

| Component: | Range, Vol. percent |
|---|---|
| $H_2$ | 55-65 |
| CO | 25-35 |
| $O_2$ | [1]0.1-0.5 |
| $C_2H_2$ | 0.5-1 |
| $C_2H_4$ | 0.2-3 |
| $CO_2$ | 2-6 |

[1]Can be as high as 3 to 4%.

It can be seen that the by-product Sacchse gas stream contains approximately two volumes of hydrogen per volume of carbon monoxide. It is, for instance, very suitable as a feed stream for methanol synthesis. It can also be seen that although acetylene was removed from the initial gas mixture, there are still small quantities of acetylene present. The purification of this gas stream, therefore, involves the removal of oxygen, acetylene and sometimes the ethylene, depending upon demands. For methanol synthesis, there are two views on the effect of ethylene in the feed gas stream. Some manufacturers of methanol require that only the oxygen and acetylene be removed whereas others require not only oxygen and acetylene removal but also ethylene. One reason for the requirement that ethylene be removed is that while it is frequently ignored as a poison in methanol synthesis, there are those who believe that it is at least an inhibitor.

Hydrogenation processes for removing oxygen, acetylene and ethylene are well known and no departures from well-known hydrogenation processes are required herein. The gas stream at 250° to 700° F, preferably at 400° to 600° F, is passed through a catalyst mass in a reactor operated at the proper temperature. The pressures will be in the range 100 to 1000 p.s.i.g., preferably 100 to 500 p.s.i.g., and the space velocity will be in the range of 2,000 to 10,000 gas volumes per volume of catalyst per hour, depending on the type of catalyst used.

Various methods have been employed for the purification of a by-product gas stream such as this, but hydrogenation is preferred because of the hydrogen present in the gas stream. Since a large quantity of carbon monoxide is also present, a hydrogenation process must be highly selective in order to hydrogenate at least the acetylene and oxygen without converting carbon monoxide. Acetylene can be removed more readily than oxygen, however, oxygen is removed more readily than ethylene. Moreover, while it is known that acetylene and oxygen can be very successfully removed from a stream containing hydrogen and carbon monoxide, the literature does not teach that ethylene can also be successfully removed from such a gas stream. In either case, these hydrogenation processes must be performed selectively without hydrogenating carbon monoxide to methanol or methane or shifting carbon monoxide to carbon dioxide by reaction with water vapor either already present or formed by the hydrogenation of oxygen. In addition, the catalyst employed in such a selective hydrogenation process must not promote coke formation by reaction of two carbon monoxide molecules to given carbon dioxide and carbon, thus $2CO \rightarrow CO_2 + C$.

Considering now catalysts which might be used for the hydrogenation of acetylene, oxygen, and, if desired ethylene, in a hydrogen-carbon monoxide gas stream, iron oxide cannot be employed because, as is well known, iron oxide promotes the reaction of two carbon monoxide molecules to form carbon dioxide and carbon. Nickel catalysts are well known hydrogenation catalysts, however, certain factors prevent their effective use in this selective hydrogenation.

The quantity of oxygen in the by-product gas stream with which this invention is concerned may be as high as 3 to 4 percent. It is known what happens when the Sacchse generator is upset, whether it is a flow condition or an oxygen accumulation due to too much oxygen or too little natural gas being fed to the generator. Whatever the cause, in commercial operation, a fluctuation in the amount of oxygen is inevitable. The chosen catalyst must, therefore, be so selective that there is no danger of a runaway reaction due to the strongly exothermic hydrogenation of carbon monoxide. This danger is encountered when a catalyst of nickel on alumina is used. Using a nickel catalyst, the temperature which initiates the hydrogenation of oxygen is very close to that which initiates a reaction with carbon monoxide. With everything under proper control, acetylene and oxygen can be hydrogenated with a nickel catalyst, but if the amount of oxygen is unduly high, the temperature rapidly approaches 500° to 600° F, the temperature at which the hydrogenation of carbon monoxide is initiated.

At about 600° F, the temperature rapidly rises toward its theoretical limit. Such being the case, a catalyst is desired which will hydrogenate oxygen or oxidize CO to $CO_2$ at a lower temperature. Obviously, nickel catalysts are unsuitable for the hydrogenation of ethylene in a gas stream containing carbon monoxide because the temperature required to initiate the hydrogenation of ethylene with nickel is even higher, being above 500° F.

As described in the Fleming U.S. Pat. No. 3,420,618, palladium on activated alumina has also been used as a catalyst for removal of acetylene, oxygen and ethylene from acetylene gas streams. With palladium, the initiation temperature for carbon monoxide hydrogenation is above 700° F rather than between 500° and 600° F, as is the case with nickel catalysts. Amount of the palladium catalyst varies from 0.1 to 1% by weight of the catalyst, which includes the support. The alumina support, which acts as a carrier for palladium, is activated alumina, i.e., one which has been calcined or otherwise heated with steam or air to raise its surface area to above 50 square meters per gram, preferably in the range of 200 to 400 square meters per gram.

Although the palladium catalyst is a substantial improvement over the nickel catalyst, it has the disadvantage of high price and short life. Under normal use, 0.3% palladium-containing catalyst has a useful life expectancy of about 5 to 6 months. The exhausted palladium catalyst resists regeneration and has to be replaced by fresh material while the metal from the spent catalyst is recovered at high cost.

The following is believed to be the most pertinent prior art known to me: U.S. Pat. Nos. 1,610,592, Rodman et al.; 1,787,795, Porter; 1,960,212, Walker; 2,031,410, Fulweiler; 2,582,885, Rosenblatt; 3,084,023, Andersen et al.; 3,420,618, Fleming; and 3,535,074, Nakashima.

The Rodman et al patent describes the use of a mixture of finely divided copper and activated carbon to remove oxygen from the atmosphere above oil in electrical apparatus. The space above the oil in the electrical apparatus is generally filled with air and during normal operation, combustible gas is mixed with the air which can produce explosive mixtures. In order to overcome this hazard, oxygen is removed with the catalyst mixture of copper and activated carbon.

The Porter patent describes removal of oxygen from natural gas or other gases composed mainly of saturated hydrocarbons. Since it is well known that methane and its homologs react with oxygen at a much higher temperature than does carbon monoxide, hydrogen or unsaturated hydrocarbons, Porter takes a portion of the natural gas stream and reacts it with oxygen at a temperature of 800°–2000° C to form carbon monoxide, water, and hydrogen. The stream containing carbon monoxide, water and hydrogen is then mixed with the remaining portion of the natural gas, and oxygen is then removed from the combined streams at a temperature of 400°–500° C. Removal of oxygen is effected by passing the combined gas stream over metallic copper in a form such as copper turnings, copper fillings, or other finely divided copper.

The Walker patent describes removal of free oxygen from natural gas to provide a fuel which is adapted for domestic and industrial heating purposes. Removal of oxygen is facilitated by the use of copper catalyst and other catalysts listed in Column 1 on page 3.

The Fulweiler patent describes purification of manufactured gases, such as coke oven gas and carburetted water gas, from oxides of nitrogen. It has been known that oxides of nitrogen, such as nitrogen monoxide and nitrogen dioxide, can be removed by contact with metallic sulfides. What Fulweiler discovered was that removal of oxides of nitrogen by contact with the metallic sulfides can be materially improved by removing the oxygen in the gas stream prior to contact with metallic sulfides. Fulweiler relies on the known method of removing oxygen from a gas stream, as for instance, at a temperature of 200° C by bringing the gas stream in contact with metallic copper to cause a reaction between the oxygen and hydrogen and carbon monoxide to form water and carbon dioxide.

At bottom of Column 1, Rosenblatt refers to the classical method of purifying hydrogen from oxygen by contacting the impure hydrogen with copper or copper compounds heated to a temperature of over 600° C.

The Andersen et al patent relates to the removal of objectionable impurities, such as acetylenics, dienes, nitrogen oxides and sulfur containing compounds. The process consists of passing the gaseous mixture over a catalyst consisting of one or more metals of the platinum group, or nickel, with or without a support. The preferred platinum metals include platinum, palladium and ruthenium.

The Fleming patent describes the same process as set forth herein with one critical distinction: whereas he uses palladium as the catalyst, copper is the catalyst herein.

The Nakashima patent describes removal of oxygen from inert gases by initially introducing an excess amount of hydrogen into the inert gases, passing the inert gas through a catalyst of a platinum group to convert oxygen into water and subsequently, contacting the inert gas with a catalyst such as copper or nickel to absorb any remaining oxygen.

The sole FIGURE is a schematic illustration of a plant in which is treated, for oxygen removal, a gas stream from acetylene plant after removal of acetylene.

Referring to the invention herein, on the basis of results from an experimental unit, it has been confirmed that copper can remove from acetylene effluent gas stream all of the remaining acetylene, more than 95% of oxygen and more than 60% of ethylene consistently over a period in excess of one year. This was achieved at space velocity, expressed in cubic feet of gas per cubic food of catalyst per hour, of about 10,000 and a temperature of 400°–600° F. By comparison, the palladium catalyst yields similar results only for 2 to 3 months and then gradually ceases to remove oxygen thereof in the succeeding 2 to 3 months in a steady decline. By using the copper catalyst, the catalyst life was trebled with only half the copper catalyst used when compared with the palladium catalyst used earlier. In comparing net catalyst cost of copper versus palladium, it was found that these costs were only 10% of the palladium which amounts to a net savings of about $350,000 per year. Additional savings of equipment damage, repair and replacement cost as well as down time and maintenance are not included.

The superior results provided by the copper catalyst is an unexpected and surprising phenomena since many problems would be expected by persons skilled in this art. Since small quantities of acetylene are present in the gas stream, one would expect the build up of copper acetylides, which are explosive. Presence of copper acetylides has been checked out experimentally and it was found that they are decomposed at operational temperatures and acetylene is completely hydrogenated to ethylene and ethane.

During the course of the operation, the gases may be in contact with the copper catalyst for short periods of time at temperatures below the composition of copper acetylides, namely, during the start up and the shut down, at which time, the possibility of acetylide formation is present. This possibility has also been checked out by conducting the gases over the copper catalyst at operating temperatures of about 200°–300° C and then reducing the temperature in 50° C increments. After each temperature reduction, the gases leaving the catalyst have been analyzed to detect any compositional changes and the temperature reduction has been carried out until ambient temperature of about 20° C was obtained. It was found that the catalyst lost considerably in oxygen, ethylene and partly in acetylene removal capability below 150° C. There is not complete material balance of ethylene, ethane, acetylene because of partial conversion of some of the acetylene to compounds other than ethylene and ethane. Formation of copper acetylides is avoided even at the lower temperatures probably because of the presence of large amount of hydrogen.

In order to test whether or not any copper acetylides had been formed, the catalyst was removed from the test unit, placed in water and then acidified for the release of acetylene, if any had been formed. This test was done in a closed container to trap any of the regenerated gases. Using highly sensitive gas chromatographic methods, no acetylene could be detected. It was, therefore, concluded that the contact of small concentrations of acetylene with copper metal in this gas composition does not form or build up any dangerous and detectable quantities of copper acetylides.

Another problem was expected as a result of the catalytic action of copper on the carbon monoxide and hydrogen to form methanol and methane or undergo carbon monoxide reactions with water to form hydrogen and carbon dioxide. This is a distinct possibility since copper-zinc combinations are used as catalysts in the modern methanol processes and copper catalyst is used as the so-called low temperature shift catalyst in, for instance, ammonium plants to remove residual carbon monoxide from the synthesis gas. In investigating this possibility, the temperature of the catalyst was raised to about 550° C and the gas was analyzed after passing through the catalyst. The analysis indicated surprisingly little change in composition and showed no methanol or methane formation. There was a small increase of carbon dioxide which indicates the shift reaction taking place. The conversion is only possible to the extent that water is available for the reaction in the gas from the equilibrium at 150–200 p.s.i.g. at a temperature of 70°–80° C while in contact with water.

The copper catalyst referred to herein may be in the form of 100% copper, as gauze, or in particle form deposited on suitable refractory catalyst support such as alumina, silica, kieselguhr, silica gel, diatomaceous earth, aluminum oxide, zirconium oxide, and the like. The quantity of the copper used on the basis of the support plus catalyst should not be less than 0.01%. Preferred copper concentration on the inert support should be between 1 to 6% by weight of copper and the support. The support for the catalyst metal may be in the form of pellets, powder or grain. The supported catalyst may be prepared in any suitable manner as by treating the carrier or support with a solution of a suitable metal compound and then reducing the metal compound to metal. More specifically, the copper catalyst can be prepared by depositing on a suitable inert catalyst support an aqueous solution of copper nitrate, acetate, or any other suitable copper salt which decomposes under heat to form metallic copper or copper oxide.

In addition to a much longer useful life and a much lower cost, the copper catalyst enjoys other advantages over the nickel or palladium catalyst presently used to treat effluent gas streams from acetylene plants. When using nickel or palladium catalysts, 2 to 3 heat exchangers were burned out every year in a particular plant due to insufficient oxygen removal which initiated methenation whereas none have burned out when the plant switched to the copper catalyst. This is a notable advantage since heat exchangers cost $60,000 to $80,000 apiece not taking into account the labor to remove and install each or the down time resulting from such destruction.

The process is further illustrated by examples which describe preparation of the catalyst and the use of a copper catalyst to treat a by-product gas stream from an acetylene plant to remove remainder of acetylene, oxygen and ethylene.

EXAMPLE I

This example illustrates prepartion of the copper catalyst pursuant to the disclosure herein.

Activated aluminum oxide balls 3/16 of an inch in diameter are tumbled in a 10% copper nitrate aqueous solution for a few minutes and then dried at 100° C in about ½ hour. The dry aluminum oxide balls are then heated to about 500° C to decompose copper nitrate to copper oxide. The amount of copper on the aluminum oxide balls is 1% by weight of the composite catalyst.

EXAMPLE II

This example shows effectiveness of copper catalyst in removing acetylene, oxygen and ethylene from acetylene plant gas effluent stream. The catalyst used was Chemetron's T-2047 catalyst which contains about 4% copper on 3/16 × 3/16 of an inch cylindrical aluminum oxide pellets. The gas purification plant has the layout shown in the appended drawing.

The diagram illustrated by the appended drawing shows the gas purification layout as it presently exists. The terms used for de-oxo and hydrogenators may be confusing and are, therefore, explained.

In its earlier operation with the palladium catalyst, the gas purification unit consisted only of the hydrogenerators. When the explosion occurred in a gas compressor due to the inefficiency of the palladium catalyst which allowed oxygen to pass through, two additional units of comparable size were added ahead of the hydrogenators for safety reasons and were called de-oxo (oxygen removal) units to distinguish between them. In present operation with the copper catalyst, the two de-oxo units are not longer necessary because of efficiency of the hydrogenator units.

The de-oxo units contained palladium catalyst which was subtantially completely spent. Each of the hydrogenation units contained 270 cubic feet of the Chemetron's T-2047 catalyst and the catalyst bed was 85 inches in diameter by 7 feet in height. The feed rate was 77.73 million SCF per day. Results and other pertinent data is given in the table below:

Table I

| component | feed gas | A train | | B train | |
| --- | --- | --- | --- | --- | --- |
| | | de-oxo | hydrog. | de-oxo | hydrog. |
| $C_2H_2 + C_2H_4$, vol. % | 0.40 | 0.29 | 0.18 | 0.32 | 0.01 |
| $C_2H_6$, vol. % | 0.0006 | 0.10 | 0.23 | 0.14 | 0.41 |

Table I-continued

| component | feed gas | A train de-oxo | A train hydrog. | B train de-oxo | B train hydrog. |
|---|---|---|---|---|---|
| $C_2H_2 + C_2H_4$ Conv., % | — | 27.50 | 37.93 | 20.00 | 96.88 |
| $O_2$, vol. % | 0.094 | 0.105 | 0.0045 | 0.15 | 0.0044 |
| $O_2$ removal, % | — | 0.0 | 95.71 | 0.0 | 97.06 |

As should be evident from the above table in reference to the A train, the amount of acetylene and ethylene in the feed stream was 0.40% which was reduced to 0.29% in the de-oxo unit containing a palladium catalyst and then reduced from 0.29 to 0.18% in the hydrogenation unit containing the copper catalyst. Reduction of acetylene and ethylene in the hydrogenation unit amounted to 37.93%. In the B train, de-oxo unit reduced amount of acetylene and ethylene content from 0.40 to 0.32% and this as reduced to 0.01% in the hydrogenation unit. Removal of the acetylene and ethylene gases in the hydrogenation unit was equivalent to 96.88%. The difference in performance between the A and B trains is mainly due to the higher temperature of the gases in the B train.

With respect to oxygen removal, de-oxo units in trains A and B were totally ineffective whereas the hydrogenation units with the copper catalyst in train A removed 95.21% and the unit in train B removed 95.71 and 95.32 to 97.06%.

EXAMPLE III

This example is similar to Example II with exception of differences noted in the table below. The same gas purification plant and copper catalyst were used.

Table II

| component | feed gas | A train de-oxo | A train hydrog. | B train de-oxo | B train hydrog. |
|---|---|---|---|---|---|
| $C_2H_2 + C_2H_4$, vol. % | 0.43 | 0.32 | 0.17 | 0.34 | 0.03 |
| $C_2H_6$, vol. % | 0.009 | 0.10 | 0.20 | 0.09 | 0.35 |
| $C_2H_2 + C_2H_4$ Conv., % | — | 25.58 | 46.8 | 20.93 | 91.18 |
| $O_2$, vol. % | 0.24 | 0.14 | 0.0052 | 0.16 | 0.0048 |
| $O_2$ removal, % | — | 41.67 | 96.29 | 33.33 | 97.00 |
| feed rate | | 57.16 MSCFD | | | |
| exit temp. A de-oxo | | 448° F | | | |
| exit temp. A hydrog. | | 500° F | | | |
| exit temp. B de-oxo | | 445° F | | | |
| exit temp. B hydrog. | | 495° F | | | |

As already noted, the plant and the copper catalyst used in Examples II and III were the same. At the time the data was taken for Examples II and III, the copper catalyst had been in use for more than 4 to 5 months. The same catalyst, after continuous use of about 1 year, gives substantially identical performance noted in Tables I and II. Of primary significance in the above experiments is the extent of oxygen removal, which is shown to be excellent.

What I claim is:

1. Process for the purification of a gas stream containing primarily hydrogen and carbon monoxide as well as small quantities of oxygen, acetylene, and ethylene as impurities, comprising passing said gas stream at a temperature of 250° to 700° F through a bed of catalyst consisting essentially of a copper catalyst for removal of substantially all of acetylene and oxygen and at least about 60% ethylene.

2. Process of claim 1 wherein the gas stream is a by-product resulting from the pyrolysis of natural gas after removal of acetylene.

3. Process of claim 1 wherein the copper catalyst is metallic copper which is deposited on a solid refractory support and the gas stream has the following composition:

| $H_2$ | 55–65 vol % |
|---|---|
| CO | 25–35 " |
| $O_2$ | 0.1–4 " |
| $C_2H_2$ | 0.5–1 " |
| $C_2H_4$ | 0.2–3 " |
| $CO_2$ | 2–6 " |

4. Process of claim 1 wherein the copper catalyst is disposed on a solid support in amount of 0.01% or more by weight of copper and the support.

5. Process of claim 4 wherein temperature of the gas is 400° to 600° F and weight of said catalyst is 1 to 6%.

6. Process of claim 5 wherein the solid support is aluminum oxide.

7. Process for the purification of a gas stream containing primarily hydrogen and carbon monoxide as well as small quantities of oxygen, acetylene and ethylene as impurities comprising passing said gas stream at a temperature of 250° to 700° F through a bed of metallic copper catalyst for removal of substantially all of oxygen.

8. Process of claim 7 wherein the gas stream is a by-product resulting from the pyrolysis of natural gas after acetylene removal.

9. Process of claim 7 wherein the catalyst is deposited on a solid refractory support and the gas stream has the following composition:

| $H_2$ | 55–65 Vol. % |
|---|---|
| CO | 25–35 " |
| $O_2$ | 0.1–4 " |
| $C_2H_2$ | 0.5–1 " |
| $C_2H_4$ | 0.2–3 " |
| $CO_2$ | 2–6 " |

10. process of claim 9 wherein temperature of the gas is 400° to 600° F and weight of the catalyst is 1 to 6%.

* * * * *